United States Patent [19]
Harrup et al.

[11] Patent Number: 6,146,787
[45] Date of Patent: Nov. 14, 2000

[54] SOLID POLYMER BATTERY ELECTROLYTE AND REACTIVE METAL-WATER BATTERY

[75] Inventors: Mason K. Harrup; Eric S. Peterson; Frederick F. Stewart, all of Idaho Falls, Id.

[73] Assignee: Bechtel BWXT Idaho, LLC, Idaho Falls, Id.

[21] Appl. No.: 09/190,039

[22] Filed: Nov. 11, 1998

[51] Int. Cl.$^7$ ........................................................ H01M 6/34
[52] U.S. Cl. ........................ 429/119; 429/315; 429/317; 429/231.6; 429/231.9; 429/231.95
[58] Field of Search .................... 429/317, 119, 429/315, 231.9, 231.95, 231.6

[56] References Cited

U.S. PATENT DOCUMENTS

| | | | |
|---|---|---|---|
| 4,840,856 | 6/1989 | Nakacho et al. | 429/192 |
| 5,414,025 | 5/1995 | Allcock et al. | 522/46 |

OTHER PUBLICATIONS

Allcock, Harry R. et al., "Synthesis and Characterization of Ionically Conducting Alkoxy Ether/Alkoxy Mixed–Substituent Poly(organophosphazenes) and Their Use as Solid Solvents for Ionic Conduction", *Macromolecules*, v. 29, #6, p. 1951–6, (1996).

Allcock, Harry R. et al., "Synthesis of Polyphosphazenes with Ethyleneoxy–Containing Side Groups: New Solid Electrolyte Materials", *Macromolecules*, vol. 29, No. 10, pp. 3384–389 (1996).

Allcock, Harry R. et al.,"Synthesis of Polyphosphazenes with Ethyleneoxy–Containing Side Groups: New Solid Electrolyte Materials", *Macromolecules*, vol. 29, No. 10, pp. 3384–389 (1996).

Selvaraj, I. Immanuel et al., "Synthesis and Ionic Conductivity Studies of New Water Insoluble Polyphosphazene Polymer Electrolytes", *J. Electrochemical Society*, vol. 142, No. 10, pp. 3434–37 (Oct. 1995).

Allcock, Harry R. et al., "An Ionically Cross–Linkable Polyphosphazene: Poly[bis(carboxylatophenoxy)phosphazene]and its Hydrogels and Membranes", and Its Hydrogels and Membranes, *Macromolecules*, vol. 22, pp. 75–79 (1989).

MacDonald, Digby D., *Yearly Report For Contract No. 95F144700\*000*, 3–55, September 1996.

Schuster, Nicholas, "Lithium–Water Power Source for Low Power–Long Duration Undersea Applications", I.E.E.E, No. 90CH2863 pp. 118–123 (1990).

*Primary Examiner*—Laura Weiner
*Attorney, Agent, or Firm*—Wells St John Roberts Gregory & Matkin

[57] ABSTRACT

In one implementation, a reactive metal-water battery includes an anode comprising a metal in atomic or alloy form selected from the group consisting of periodic table Group 1A metals, periodic table Group 2A metals and mixtures thereof. The battery includes a cathode comprising water. Such also includes a solid polymer electrolyte comprising a polyphosphazene comprising ligands bonded with a phosphazene polymer backbone. The ligands comprise an aromatic ring containing hydrophobic portion and a metal ion carrier portion. The metal ion carrier portion is bonded at one location with the polymer backbone and at another location with the aromatic ring containing hydrophobic portion. The invention also contemplates such solid polymer electrolytes use in reactive metal/water batteries, and in any other battery.

31 Claims, 2 Drawing Sheets

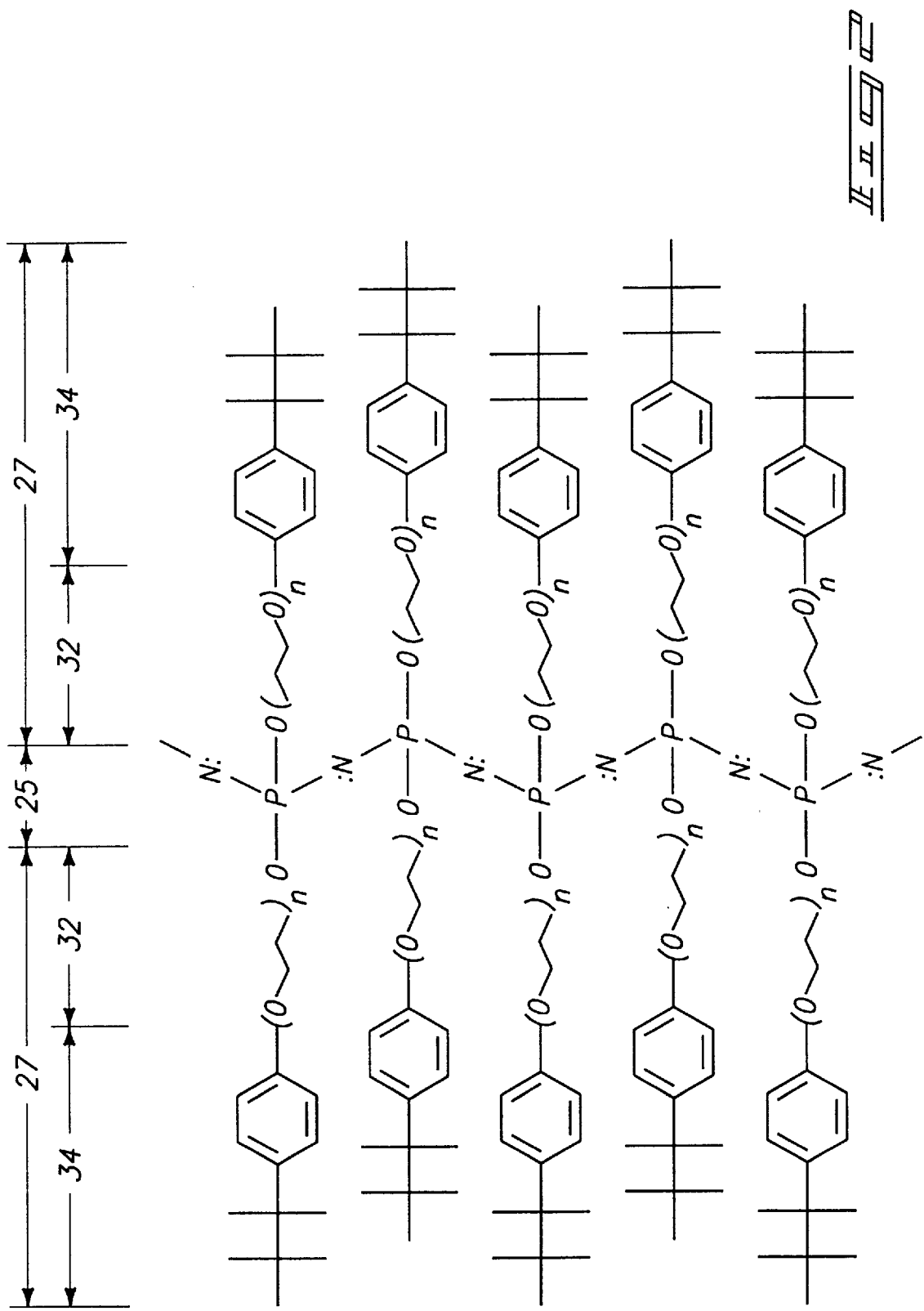

SOLID POLYMER BATTERY ELECTROLYTE AND REACTIVE METAL-WATER BATTERY

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

TECHNICAL FIELD

This invention relates generally to reactive metal-water batteries and to reactive metal-water battery solid polymer electrolytes.

BACKGROUND OF THE INVENTION

A battery is a device that converts the chemical energy contained in its active materials directly into electrical energy by means of an electrochemical oxidation-reduction reaction. This type of reaction involves the transfer of electrons from one material to another through an electric circuit when the battery is placed under a load. A battery typically comprises one or more electrochemical cells connected in series, parallel, or both, depending on desired output voltage and capacity. Each cell principally comprises an anode, a cathode, and an electrolyte. The anode, or negative electrode, gives up electrons to the external circuit and is oxidized during the electrochemical reaction. The cathode, or positive electrode, accepts electrons from the external circuit and is reduced during the electrochemical reaction. The electrolyte serves as the ionic conductor and provides the medium for transfer of ions inside the cell between the anode and the cathode, and typically comprises liquid, solid or gel materials. Some batteries are intended for single use, and once discharged are discarded (commonly termed as primary batteries). Other batteries are more readily designed to be recharged essentially to their original condition upon discharge (commonly termed as secondary batteries).

Periodic table Group 1A and Group 2A metals, and particularly lithium, are attractive as battery anode materials because of their light weight, high voltage, high electrochemical equivalence, and good conductivity. One type of battery comprises a reactive metal-water battery, such as a Li-water battery. Such batteries today are principally fabricated for low power and long duration, but may find other uses. With such a battery, the reactive metals such as lithium serve as the anode. The cathode is principally comprised of water. The electrolyte can be solid or liquid. For lithium, the principal reactions are:

| Anode | $Li - e^- \rightarrow Li^+$ |
| Cathode | $H_2O + e^- \rightarrow OH^- + \frac{1}{2}H_2$ |
| Overall | $Li + H_2O \rightarrow LiOH + \frac{1}{2}H_2$ |

However, as apparent from the overall electrochemical reaction, lithium and water will also react directly with one another, essentially resulting in parasitic corrosion of the anode when exposed to water. The corrosion reaction is highly undesirable because it produces no useful electrical energy and consumes active lithium. The reaction is highly exothermic and can detrimentally accelerate local corrosion. Further, the produced lithium hydroxide reacts with water and eventually precipitates as a monohydrate crystal. Accordingly, a principal challenge with respect to reactive metal-water batteries is development of techniques that minimize this parasitic corrosion, thereby extending battery life and improving efficiency. With liquid electrolytes, this has typically focused on liquid additives that enhance or result in formation of a calcareous film upon the outer surface of the lithium metal as a means of protecting the metal from contact with water. Work has also been conducted in the past with solid polymer electrolytes, but without much success due to one or both of low current output and water permeability which shortens life.

Accordingly, needs remain for improved reactive metal-water batteries and solid polymer electrolytes therefor. While the invention was principally motivated in solving problems with respect to this particular art area, the artisan will appreciate applicability of the invention in other areas, with the invention only being limited by the accompanying claims appropriately interpreted in accordance with the Doctrine of Equivalents.

SUMMARY OF INVENTION

In one implementation, a reactive metal-water battery includes an anode comprising a metal in atomic or alloy form selected from the group consisting of periodic table Group 1A metals, periodic table Group 2A metals and mixtures thereof. The battery includes a cathode comprising water. Such also includes a solid polymer electrolyte comprising a polyphosphazene comprising ligands bonded with a phosphazene polymer backbone. The ligands comprise a aromatic ring containing hydrophobic portion and a metal ion carrier portion. The metal ion carrier portion is bonded at one location with the polymer backbone and at another location with the aromatic ring containing hydrophobic portion. The invention also contemplates such solid polymer electrolytes use in reactive metal-water batteries, and in any other battery.

BRIEF DESCRIPTION OF THE DRAWINGS

Preferred embodiments of the invention are described below with reference to the following accompanying drawings.

FIG. 2 is a diagrammatic representation of chemical formula of a solid polymer battery electrolyte in accordance with but one aspect of the invention.

DETAILED DESCRIPTION OF THE PREFERRED EMBODIMENTS

Figure 1:
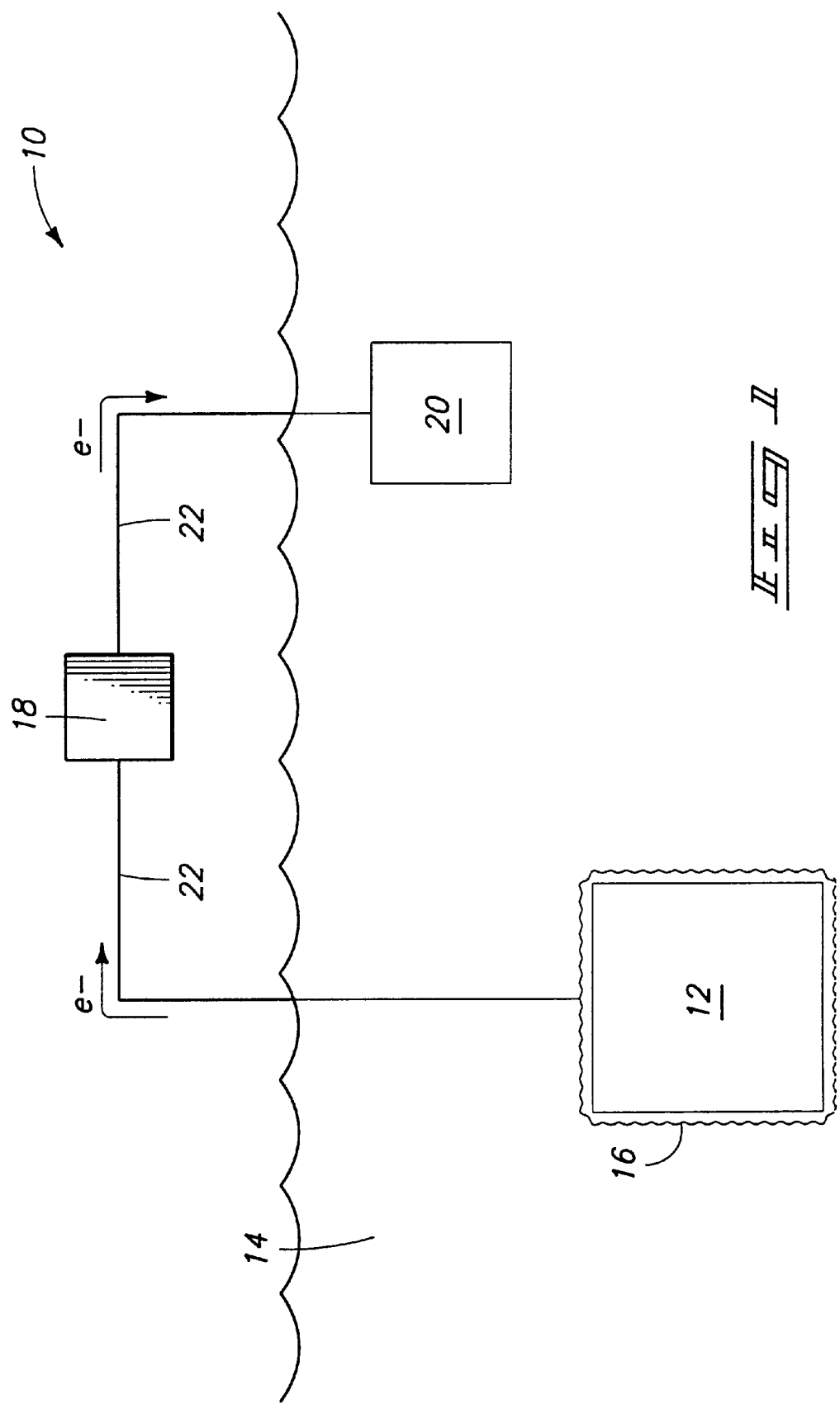
FIG. 1 is a diagrammatic schematic of a reactive metal-water battery in accordance with an aspect of the invention.

This disclosure of the invention is submitted in furtherance of the constitutional purposes of the U.S. Patent Laws "to promote the progress of science and useful arts" (Article 1, Section 8).

Referring to FIG. 1, a reactive metal-water battery system under load is designated with numeral 10. Such comprises an anode 12, a cathode 14 and a solid polymer electrolyte 16. The battery is illustrated as being subjected to some suitable discharge load 18. In one implementation, anode 12 comprises a metal in atomic or alloy form selected from the group consisting of periodic table Group 1A metals, periodic table Group 2A metals and mixtures thereof. Cathode 14 comprises water. An electrode 20 is received within cathode 14, with the battery being discharged through load 18 via a conductive line 22 extending from anode 12 to electrode 20 and correspondingly cathode 14. Electrode 20 preferably comprises porous conductive copper, and effectively serves to provide an enlarged conductive surface area from line 22 for electrical communication with cathode 14.

An exemplary commercial version of a battery in accordance with the invention would comprise components 12, 16 and 20 received within a suitable housing and essentially void of cathode-water in storage. Upon preparation for use, cathode-water would be provided relative to the housing and the battery placed under load. For use in water such as in oceanic applications, the housing might be provided to be suitably permeable to water such that immersion in salt water results in seawater permeating into the housing to function as a cathode material and effectively "turn on" a pre-wired load 18.

Solid polymer electrolyte 16 comprises a polyphosphazene material comprising ligands bonded with a phosphazene polymer backbone. The ligands comprise an aromatic ring containing hydrophobic portion and a metal ion carrier portion. The metal ion carrier portion is bonded at one location with the polymer backbone, and at another location with the aromatic ring containing hydrophobic portion. The metal ion carrier portion preferably does not include any aromatic ring. One preferred desired effect from such a construction results in the polymer backbone functioning as the core of the material which is surrounded by an ionic conducting channel which is itself surrounded or otherwise protected by a hydrophobic material which is ideally remote from the backbone core. Another preferred desired effect of such a construction, when the battery is not under load, is receipt or alignment of the reactive metal along the polymer backbone and corresponding displacement of water therefrom by the hydrophobic portion of the solid electrolyte material. The reactive metal will preferably associate with exposed electron pairs of nitrogen atoms on the backbone. Upon application of suitable load, metal ions of the anode will displace relative to the nitrogen atoms of the polymer backbone and be received by and transported/conducted along the ion carrier portion, thus forming a desired electrical circuit of suitable and desired conductivity. An example is described below with reference to FIG. 2.

The metal ion carrier portion preferably comprises an ether, such as an oxyether or a thioether. More preferred are polyethers, alkeneoxy ethers and alkeneoxy ether polymers. Examples are materials selected from the group consisting of ethyleneoxy ethers, propyleneoxy ethers and mixtures thereof. Further preferred are ethylene thioethers, propylene thioethers, and mixtures thereof.

The hydrophobic portion preferably comprises an aromatic ring (including heteroaromatic rings) having at least one hydrocarbon group or halohydrocarbon group bonded therewith. Further, the hydrophobic portion preferably comprises at least 7 carbon atoms, and further at least one terminal hydrocarbon or halohydrocarbon group. Substituted phenols are example preferred materials, such as hydrocarbon and halohydrocarbon substituted phenols.

Performance enhancing additives can also of course be provided as part of the battery or electrolyte. By way of example only, such include ceramic precursors, substituted phosphazene trimers, and cross linking materials or treatments.

FIG. 2 illustrates but one exemplary implementation of a solid polymer battery electrolyte in accordance with the invention. Such depicts a polyphosphazene polymer backbone 25 having associated ligands 27. Ligands 27 comprise an ion channel or metal ion carrier portion 32 bonded at one location with polymer backbone section 25. Ligands 27 also comprise a hydrophobic portion bonded with metal ion carrier portions 32 at another location thereof. In the illustrated example, the hydrophobic portion is depicted as 4-(2,2,3,3 tetramethylbutyl) phenol. The metal ion carrier portion is depicted as an ethylenoxyether polymer, where "n" is an integer preferably falling from 1 to 16. The illustrated example depicts a homopolymer where all the ligands are the same, but co-polymers are also of course contemplated with varying ligands, at least an effective amount of which constitutes the described metal ion carrier and hydrophobic portions.

One example and preferred technique in battery fabrication in accordance with the invention will result in a coating of the solid polymer electrolyte material to cover an entirety of the outer surface of the lithium or other reactive metal anode. Such is preferably achieved by dissolving the solid polymer electrolyte material in a suitable solvent, such as tetrahydrofuran (THF). This liquid material is then brushed onto the anode, or the anode dipped within the solvent/electrolyte system, to fully coat the anode. The solid electrolyte can be formed by combining a polyphosphazene, such as polydichlorophosphazene, with an alkoxide comprising the ligands, such as a sodium alkoxide. The sodium alkoxide, for example, can be produced by combining the ligands in alcohol form with sodium. Alternate techniques of fabrication are also, of course, possible.

EXAMPLE

One hundred ten (110) ml of Triton-X-114™ was combined in a vessel with 300 ml of anhydrous tetrahydrofuran. Triton-X-114™ is available from Aldrich Chemical Company of Milwaukee, Wis. Six (6) grams of sodium was freshly cut, hexane-washed, dried and added to the mixture. The mixture was stirred and heated at 65° C. under an Ar atmosphere until the sodium was consumed.

A solution containing 10 grams of dichloropolyphosphazene was dissolved in 300 ml of a solvent comprising a 1:1 by volume mix of diglyme and THF. This solution was slowly added to the above solution under an argon atmosphere. Two hundred (200) ml of additional diglyme/THF solvent was added, and the mixture stirred. Such was heated under an argon atmosphere for two days. Salts were precipitated by multiple water addition and polymer washings with subsequent combinations with THF. The polymer was ultimately centrifuged and dried in vacuo to remove all water. One gram of the resultant polymer was dissolved in 10 grams of THF, and provided with approximately 4.6 weight percent $LiBF_4$ in solution. A lithium metal anode was immersed in the subject solution to dip coat the lithium metal anode. Such was subsequently dried in vacuum to remove the casting solvent, thus forming a lithium anode coated with a solid polymer electrolyte in accordance with an aspect of the disclosure.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A reactive metal-water battery comprising:
   an anode comprising a metal in atomic or alloy form selected from the group consisting of periodic table Group 1A metals, periodic table Group 2A metals and mixtures thereof;

a cathode comprising water; and a solid polymer electrolyte comprising a polyphosphazene comprising ligands bonded with a phosphazene polymer backbone, the ligands comprising an aromatic ring containing hydrophobic portion and a metal ion carrier portion, the metal ion carrier portion being bonded at one location with the polymer backbone and at another location with the aromatic ring containing hydrophobic portion.

2. The reactive metal-water battery of claim 1 wherein the aromatic ring is heteroaromatic.

3. The reactive metal-water battery of claim 1 wherein the metal ion carrier portion is bonded to an aromatic ring of the hydrophobic portion.

4. The reactive metal-water battery of claim 1 wherein the metal ion carrier portion is void of any aromatic ring.

5. The reactive metal-water battery of claim 1 wherein metal ion carrier portion comprises an oxyether.

6. The reactive metal-water battery of claim 1 wherein the metal ion carrier portion comprises a thioether.

7. The reactive metal-water battery of claim 1 wherein the metal ion carrier portion comprises a polyether.

8. The reactive metal-water battery of claim 1 wherein the metal ion carrier portion comprises an alkeneoxy ether.

9. The reactive metal-water battery of claim 1 wherein the metal ion carrier portion comprises an alkeneoxy ether polymer.

10. The reactive metal-water battery of claim 1 wherein the metal ion carrier portion comprises a material selected from the group consisting of ethyleneoxy ethers, propyleneoxy ethers and mixtures thereof.

11. The reactive metal-water battery of claim 1 wherein the hydrophobic portion comprises an aromatic ring having at least one hydrocarbon group or halohydrocarbon group bonded therewith.

12. The reactive metal-water battery of claim 1 wherein the hydrophobic portion comprises at least 7 carbon atoms.

13. The reactive metal-water battery of claim 1 wherein the hydrophobic portion comprises at least one terminal hydrocarbon group.

14. The reactive metal-water battery of claim 1 wherein the hydrophobic portion comprises at least one terminal halohydrocarbon group.

15. The reactive metal-water battery of claim 1 wherein the metal ion carrier portion comprises an alkeneoxy ether and the hydrophobic portion comprises an aromatic ring having at least one hydrocarbon group or halohydrocarbon group bonded therewith.

16. A solid polymer battery electrolyte comprising a polyphosphazene comprising ligands bonded with a phosphazene polymer backbone, the ligands comprising an aromatic ring containing hydrophobic portion and a metal ion carrier portion, the metal ion carrier portion being bonded at one location with the polymer backbone and at another location with the aromatic ring containing hydrophobic portion.

17. The solid polymer battery electrolyte of claim 16 wherein the aromatic ring is heteroaromatic.

18. The reactive metal-water battery of claim 16 wherein the metal ion carrier portion is bonded to an aromatic ring of the hydrophobic portion.

19. The reactive metal-water battery of claim 16 wherein the metal ion carrier portion is void of any aromatic ring.

20. The solid polymer battery electrolyte of claim 16 wherein metal ion carrier portion comprises an oxyether.

21. The solid polymer battery electrolyte of claim 16 wherein the metal ion carrier portion comprises a thioether.

22. The solid polymer battery electrolyte of claim 16 wherein the metal ion carrier portion comprises a polyether.

23. The solid polymer battery electrolyte of claim 16 wherein the metal ion carrier portion comprises an alkeneoxy ether.

24. The solid polymer battery electrolyte of claim 16 wherein the metal ion carrier portion comprises an alkeneoxy ether polymer.

25. The solid polymer battery electrolyte of claim 16 wherein the metal ion carrier portion comprises a material selected from the group consisting of ethyleneoxy ethers, propyleneoxy ethers and mixtures thereof.

26. The solid polymer battery electrolyte of claim 16 wherein the hydrophobic portion comprises an aromatic ring having at least one hydrocarbon group bonded therewith.

27. The solid polymer battery electrolyte of claim 16 wherein the hydrophobic portion comprises an aromatic ring having at least one halohydrocarbon group bonded therewith.

28. The solid polymer battery electrolyte of claim 16 wherein the hydrophobic portion comprises at least 7 carbon atoms.

29. The solid polymer battery electrolyte of claim 16 wherein the hydrophobic portion comprises at least one terminal hydrocarbon or halohydrocarbon group.

30. The solid polymer battery electrolyte of claim 16 wherein the hydrophobic portion comprises at least 7 carbon atoms and at least one terminal hydrocarbon or halohydrocarbon group.

31. The solid polymer battery electrolyte of claim 16 wherein the metal ion carrier portion comprises an alkeneoxy ether and the hydrophobic portion comprises an aromatic ring having at least one hydrocarbon group or halohydrocarbon group bonded therewith.

* * * * *